United States Patent [19]
Covert

[11] Patent Number: 5,341,918
[45] Date of Patent: Aug. 30, 1994

[54] ARTICLE TRANSFER DEVICE

[76] Inventor: William J. Covert, P.O. Box 365, Berlin, N.J. 08009

[21] Appl. No.: 46,944

[22] Filed: Apr. 16, 1993

[51] Int. Cl.[5] ............................................. B65G 33/26
[52] U.S. Cl. .................................. 198/659; 198/467.1
[58] Field of Search .................... 198/467.1, 657, 659, 198/660, 661, 662, 836.1, 836.2, 836.3

[56] References Cited

U.S. PATENT DOCUMENTS

| | | | |
|---|---|---|---|
| 3,727,746 | 4/1973 | Slusher | 198/659 |
| 4,566,583 | 1/1986 | Schneider | 198/659 X |
| 4,807,421 | 2/1989 | Araki et al. | 198/803.8 X |
| 4,969,348 | 11/1990 | Clowes et al. | 198/657 X |

FOREIGN PATENT DOCUMENTS

| | | | |
|---|---|---|---|
| 2294952 | 8/1976 | France | 198/659 |
| 4-12921 | 1/1992 | Japan | 198/659 |
| 4-45008 | 2/1992 | Japan | 198/467.1 |
| 4-89707 | 3/1992 | Japan | 198/659 |
| 0222781 | 10/1968 | U.S.S.R. | 198/657 |
| 1504174 | 8/1989 | U.S.S.R. | 198/660 |

*Primary Examiner*—James R. Bidwell
*Attorney, Agent, or Firm*—Norman E. Lehrer

[57] ABSTRACT

An article transfer device for transferring articles from a first position to a second position including a transfer screw, a conveying system, a stationary dead plate and a pressure adjustment wall. The screw is constructed from a flexible material and is essentially a continuous helical spiral having its ends connected to a support structure. Because of the flexible nature of the screw, different size articles can be transferred across the dead plate without having to change the screw. The article transfer device is useful in a clean room and less clean room application where articles need to be transferred between the rooms without returning any contaminants to the clean room. No individual part of the transfer device moves from the clean room to the less clean room and back again, thereby maintaining the sterile environment in the clean room. When it is desired that a different size article be transferred between the rooms, the pressure wall is adjusted so that the screw conforms to the different size articles and transfers the same. Lost production time and additional labor are eliminated as a result of the conforming nature of the article transfer device.

13 Claims, 2 Drawing Sheets

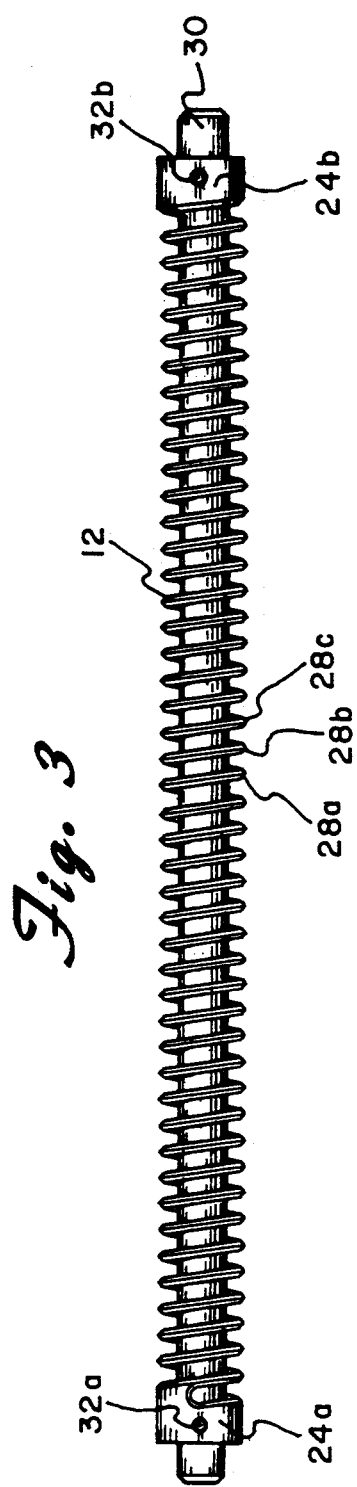
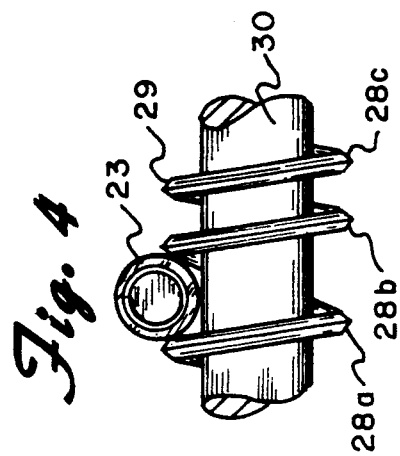
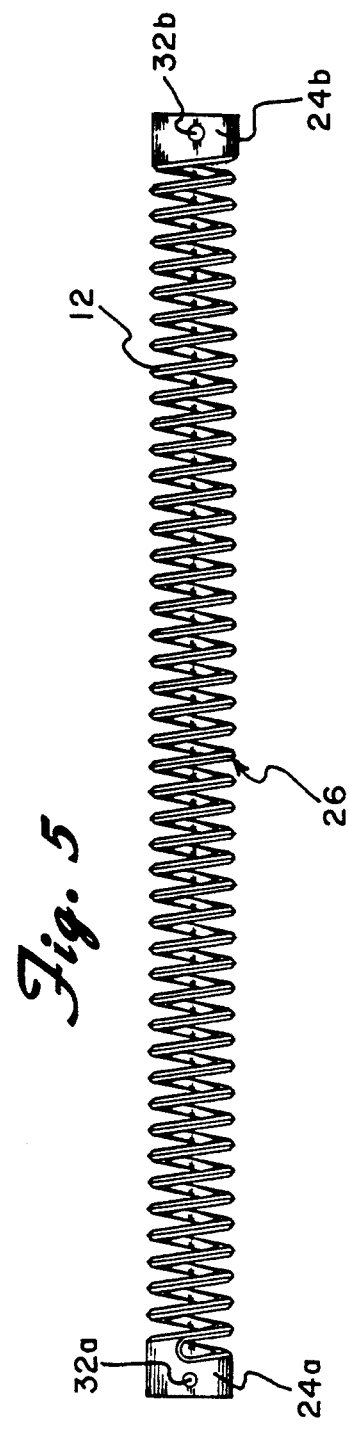

ARTICLE TRANSFER DEVICE

BACKGROUND OF THE INVENTION

The present invention relates to article conveying systems wherein an article is transferred from a first position to a second position. More particularly, this invention is directed toward a transfer screw used for transferring articles from a clean room to a less clean room wherein the screw is capable of conforming to different size articles for transferring the same. Accordingly, if it is desired to transfer a new and different size article between the rooms, the screw does not have to be changed to accomplish this end.

The conveyance of articles from a clean room to a less clean room such as during the bottling of pharmaceuticals poses problems for typical conveying systems. Typical conveying systems usually incorporate the use of a continuous and moving belt. Because a belt conveyer moves in a repetitive circular manner, if it were to be used between a sterile and a less sterile environment, the belt would tend to transfer contaminants from the less sterile room back to the more sterile room. Accordingly, the cleaner environment would become contaminated. Therefore, it is necessary to transfer articles from a clean room to a less clean room in a different manner.

A screw extended longitudinally between the clean and less clean rooms can accomplish this result. However, most screws are of the substantially rigid variety wherein only a screw having a pitch which accommodates the size of the article to be transferred can be used. As such, if it is desired to transfer a different size article, which can be accomplished when using belt-transfer methods, it is necessary to change the screw to accommodate the different size.

The prior art does include screws used to transfer materials from a first position to a second position. However, in the prior art, the screws are generally used to transfer granular materials in an auger-type machine. These screws do have some degree of longitudinal flexibility but are limited by being attached to a central core or being formed from a substantially inflexible material. Nevertheless, the screws in the prior art which are flexible are not used for the same purpose as the screw disclosed in this invention.

For example, U.S. Pat. No. 3,802,551 to Summers discloses a screw for transporting granular material from one point to another point. To avoid breakage of the screw, the Summers invention allows the screw to deform upon start-up to adjust to the initial load of the granular material being transported. However, the Summers screw is of limited flexibility and is not designed to conform to different size articles.

U.S. Pat. No. 4,611,532 to Trinkley discloses a device that resembles a screw. However, it is not used for longitudinal transfer. Trinkley discloses a food separating device comprised of a central core having circular blades attached thereto for moving and aligning articles of food passing under the device. The blades are comprised of a flexible material which conforms in some degree to different size food articles. However, the device in Trinkley is not used for, nor is it capable of, transferring articles in a longitudinal direction along the length of the screw. In both Summers and Trinkley, the flights of the screw are rigidly attached to a central core which limits the flexibility of the flights in the axial direction.

U.S. Pat. No. 5,099,986 to Kuzab and U.S. Pat. No. 4,819,578 to Koisaw, et al. also disclose semi-flexible screws for transporting granular materials. Again, these screws lack the ability to substantially conform to larger articles and are used only for granular substances.

SUMMARY OF THE INVENTION

The invention disclosed herein is directed toward an article transfer device for transferring articles over a stationary object and having the capacity to conform to a variety of different size articles such that when the need arises to convey a different size article, the transfer device does not have to be changed.

In accordance with the invention, the article transfer device comprises a transfer screw having longitudinal flexibility between its flights such that it may conform to different size articles. The screw is constructed from a flexible material formed into a continuous helical spiral having sufficient stability yet longitudinal or axial flexibility.

The transfer apparatus is positioned between an origin position, preferably a clean room, and a destination position, preferably a less clean room. The invention further includes the incorporation of the screw with other elements.

A stationary dead plate is located between the origin and destination position with the screw positioned adjacent the dead plate. In addition, a conveying system is used for conveying articles to and away from the dead plate. Accordingly, the screw is used to transfer articles from the origin position to the destination position without causing any element of the apparatus to move from the origin position to the destination position and back again to the origin position. The apparatus is particularly useful in a clean room and less clean room situation where it is desired that none of the contaminants from the less clean room are transferred to the clean room.

The invention also includes the method of transferring articles from a clean room to a less clean room by use of the screw, dead plate, and conveying system wherein if the size of the articles to be transferred is changed, the screw and apparatus is capable of conforming and transferring the articles in the same manner without adjusting or changing the parts.

This invention allows the transfer of articles of different sizes from one position to a second position over a stationary object without having to change or adjust the article-transfer device. Accordingly, down time and labor associated with adjusting or altering a transfer device to conform to different size articles, when it is desired that such articles be transferred in lieu of preceding articles, is precluded.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 3 is a front view of the transfer screw with the central core therethrough;

FIG. 4 is an enlarged view of the screw shown in FIG. 3 showing the longitudinal flexibility between the flights, and FIG. 5 is a front view of the screw without the central core therethrough.

DETAILED DESCRIPTION OF THE PREFERRED EMBODIMENT

Figure 1:
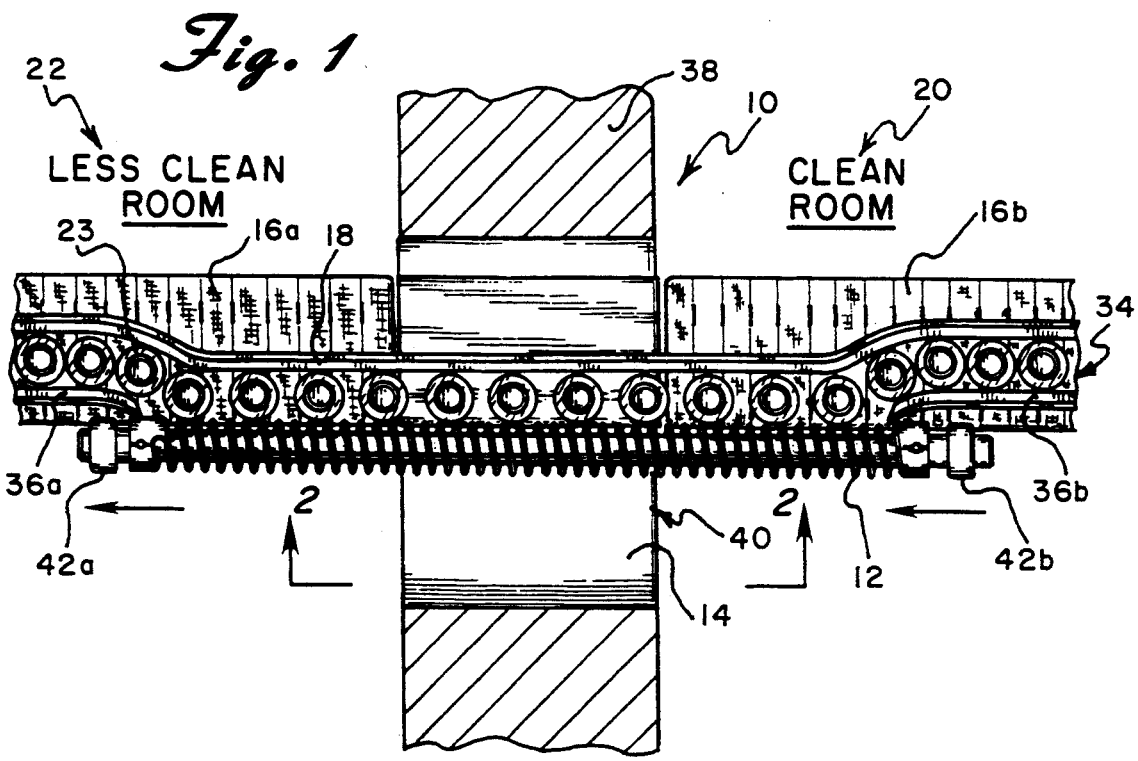
FIG. 1 is a top plan view showing the article transfer device including the transfer screw being used between a clean room and a less clean room for conveying bottles.

Referring now to the drawings in detail wherein like reference numerals have been used throughout the various figures to designate like elements, there is shown in FIG. 1 a top view of the article transfer apparatus constructed in accordance with the principles of the present invention and designated generally as 10. The article transfer device is essentially comprised of a transfer screw 12, a dead plate 14, conveyers 16a and 16b, and the pressure adjustment wall 18, all of which are positioned between a clean room 20 and a less clean room 22.

Referring now to FIG. 5, the screw 12 is formed from a substantially continuous spiral of flexible material having mounting ends 24a and 24b. This screw 12 can be formed from machining flexible material, preferably polyethylene, into the helical spiral as shown in FIG. 5. Because of the flexible nature of the material used to form the screw, the flight section 26 is highly flexible in the longitudinal or axial direction as well as other directions which allow the flights to partially envelope the articles to be transferred. However, the individual flights 28a–28c, as shown in FIG. 3, are of sufficient rigidity to maintain the screw shape as shown in FIG. 5. The flights 28a–28c are representative of the entire flight portion 26, and any reference made to flights 28a–28c is similarly applicable to the remaining flights in the flight portion 26.

The flights 28a–28c have cammed or angularly machined edges 29, as shown in FIG. 4, so as to initiate the conformance of the flights to the article 23. While FIG. 3 shows a central core 30 extending through the screw 12, FIG. 4 shows that the flights are unattached to the central core so as to retain their flexibility. The central core 30 is merely a cylindrical rod formed from a rigid material for providing stability to the screw 12 in the radial direction, i.e. in the direction transverse to the movement of the articles 23. As shown in FIG. 5, the ends 24a and 24b have threaded holes 32a and 32b therein, respectively, for securing the screw 12 to the central core 30 via set screws.

The screw 12 is preferably rotated via any known rotating means, such as a motor or the like, downwardly toward the articles being transferred. By rotating in this direction, potentially contaminating particles are directed to the floor instead of upward into flowing air. Accordingly, contamination of air which may flow from room to room is at least partially precluded.

Figure 2:
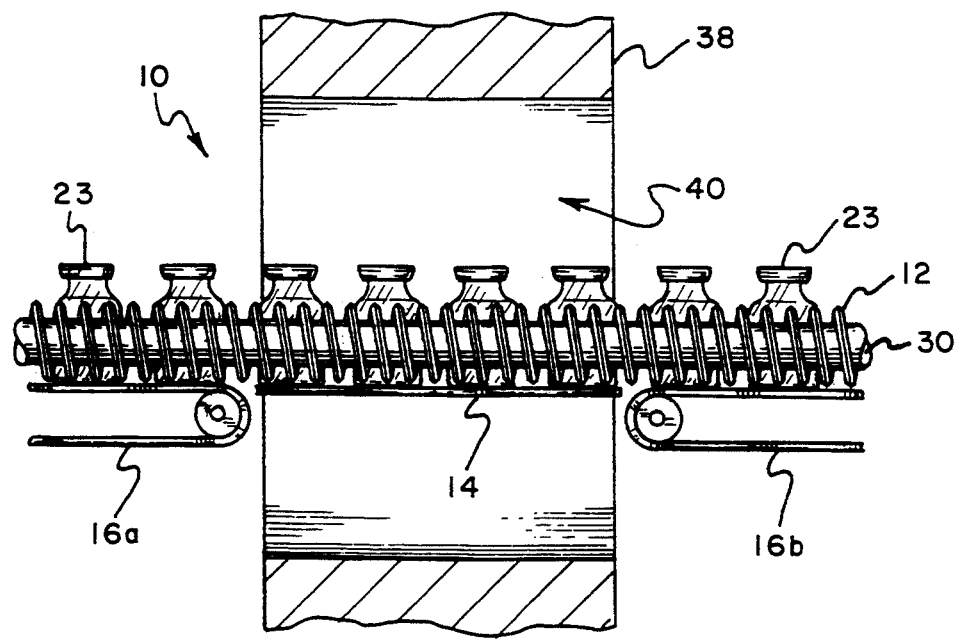
FIG. 2 is a front view of the article transfer device taken along the line 2—2 of FIG. 1.

The article transfer device 10 further includes the use of the dead plate 14. The dead plate 14 is a stable horizontally extending platform comprised of a rigid material for supporting the articles 23. In the configuration shown in FIG. 1, the dead plate 14 is positioned at a center point between the clean room 20 and the less clean room 22. As such, the conveyer 16b transfers the articles to the dead plate 14 while the screw 12 moves the articles across the dead plate to the conveyer 16a which transfers to articles 23 away from the dead plate. As shown in FIG. 2, the screw 12 is positioned adjacent the dead plate and in alignment with the track 34 (discussed in detail below) and the articles therein being transferred to the dead plate. The conveyers 16a and 16b are typical belt conveyers, as shown in FIG. 2, and function to move the articles 23 to the dead plate and away from the same.

Finally, the article transfer device includes the track 34 as defined by the guide rails 36a and 36b and the pressure wall 18. The pressure wall 18 is comprised of a vertically extending rail having a curvilinear shape for guiding the articles into the screw transfer area. The pressure wall 18 is slidably attached relative to the dead plate 14 for adjusting the pressure applied to the articles 23 as they move longitudinally across the dead plate 14 via the screw 12. For example, slots, rollers or the like can be used for adjusting the position of the pressure wall 18 relative to different size articles. As the pressure applied by the pressure wall 18 is increased, the flights as shown in FIG. 3 tend to conform to the articles by moving in a longitudinal direction. As such, different size articles can be transferred via the screw by adjusting the pressure applied by the pressure wall 18 so that the screw flights 28a–28c conform to the articles and transfer them across the dead plate 14. As shown in FIG. 1, the guide rails 36a and 36b and the end portions of the pressure wall 18 are curved away from the ends of the transfer screw 12 for directing the articles 23 away from the ends 24a and 24b of the screw 12 and more towards the center of the conveyers 16a and 16b.

The article transfer device is used in the following manner. For a clean room and less clean room application such as in the bottling of pharmaceuticals, it is essential that a partition 38 be placed between the rooms wherein the partition has an opening 40 therethrough. The dead plate 14 is centered within the opening 40 and must be of sufficient length to extend the entire width of the partition 38. The conveyers 16a and 16b are positioned on either side of the partition 38 and in alignment with the dead plate 14 such that the surfaces of the conveyers are on the same plane as the upper surface of the dead plate. Accordingly, the articles 23 can be conveyed to the dead plate 14 via the conveyer 16b such that the transfer of the articles 23 to the dead plate is a smooth one.

The screw 12 and core 30 are similarly positioned on the centerline of the partition 38 and the core 30 is secured to the bearing blocks 42a and 42b which are secured to a support structure (not shown). The track 34 is similarly positioned on the centerline of the partition 38 as shown in FIG. 1. The pressure wall 18, via its slidable attachment to the dead plate 14, should be adjusted to cause the distance between the wall 18 and the screw 12 to be substantially equal to the width of the articles 23. The pressure wall 18 can also be adjusted to apply more pressure to the articles depending upon the efficiency of the conveying action. The conveyer is then loaded with the articles 23 and the conveyers 16a and 16b are turned on and the articles 23 will be transferred to the dead plate 14. The rotating screw 12, driven by a motor or the like, will then engage the articles 23 via the flexible flight section 26 and transfer the articles across the dead plate 14. The screw transfers the articles to conveyer 16a by the continual rotation of the screw and the spiral effect of the helical arrangement wherein the articles are guided by the flights in the direction of the spiral. The articles are subsequently moved away from the dead plate via conveyer 16a.

If it is desired that the size of the articles 23 be changed for whatever reason, the screw does not have to be changed in order to continue the transfer of the articles across the dead plate to the less clean room. The pressure wall 18 is simply adjusted so that the distance between the wall and the screw is again substantially equal to the width of the new size articles. Because of the flexibility of the flight portion 26 of the screw 12, the screw will conform to the different size articles and transfer the same across the dead plate in the same manner as it did for the previous articles.

The present invention may be embodied in other specific forms without departing from the spirit or essential attributes thereof and accordingly reference should be made to the appended claims rather than to the foregoing specification as indicating the scope of the invention.

What is claimed is:

1. An automated conveying device for transporting individual articles of a plurality of different sizes and shapes from a first to a second location, said device comprising a flexible body portion having means for automatically conforming to the size and shape of each individual article and transporting said individual article to said second location said conveying device being in the form of a screw adapted to be rotated and comprising a plurality of connected flights comprising said conforming means whereby said screw does not have to be changed or adjusted when the size or shape of the articles change, said flights automatically flexing away from or toward each other to accommodate different size articles.

2. The invention according to claim 1 wherein said conforming means is comprised of said screw in the form of a continuous helical spiral of flexible material wherein said flights include cammed outer edges and exhibit multidirectional axial flexibility for partially enveloping said articles during transport.

3. The invention according to claim 2 wherein said screw has a central core extending therethrough, at least the major portion of said spiral being unattached to said central core.

4. An apparatus for transporting articles from a clean room to a less clean room, said apparatus comprising:
a screw adapted to be rotated comprising a plurality of connected flights comprised of a continuous helical spiral of flexible material, said flights exhibiting multidirectional axial flexibility by automatically flexing away from or toward each other for partially enveloping said articles during transport and automatically conforming to the size and shape of different size articles;
a dead plate positioned in an opening between said rooms for supporting said articles during conveyance by said screw;
a conveying system for transporting said articles to said dead plate and away from said dead plate, and said screw being positioned adjacent said dead plate for moving said articles over said dead plate and between said rooms.

5. The invention according to claim 4 further comprising a pressure adjustment means for pushing said articles against said screw.

6. The invention according to claim 5 wherein said pressure adjustment means comprises an adjustable wall, said wall being adapted to be moved toward or away from said screw for adjusting the pressure in which said articles contact said screw.

7. The invention according to claim 5 wherein said dead plate is a substantially rectangular platform.

8. The invention according to claim 4 wherein said conveying system is comprised of two conveyers, a first conveyer for moving said articles to said screw and said dead plate, and a second conveyer for moving said articles away from said dead plate and said screw.

9. A method for transferring individual articles having different sizes and shapes from a first location to a second location comprising the steps of:
positioning an automated conveying device between said first and second locations, said device comprising a flexible body portion having means adapted to conform to the size and shape of each individual article and for moving said articles, and
transferring said individual articles from said first position to said second position via said body portion conforming to said individual articles and moving the same,
wherein said conveying device is in the form of a screw adapted to be rotated and comprising a plurality of connected flights comprising said conforming means whereby said screw does not have to be changed or adjusted when the size or shape of the articles change.

10. The method of claim 9 wherein said first position is a clean room and said second position is a less clean room.

11. The method of claim 9 wherein said conforming means is comprised of said screw in the form of a continuous helical spiral of flexible material wherein said flights exhibit multidirectional axial flexibility for partially enveloping said articles.

12. The method of claim 9 further comprising the steps of:
providing a partition between said rooms, said partition having an opening therein;
providing a dead plate and positioning said dead plate between said rooms and in said opening;
providing a conveying system for moving said articles to said opening and deadplate and away from said opening and deadplate, and
positioning said screw adjacent said dead plate and transferring said articles there across from said clean room to said less clean room.

13. The method of claim 12 further comprising the steps of:
providing articles of different size to be transferred by said screw, and
allowing said screw to conform to said different size articles and transferring said different size articles across said dead plate.

* * * * *